G. H. LANGTON.
BUSHING LOCK.
APPLICATION FILED JUNE 18, 1919.
1,363,663.
Patented Dec. 28, 1920.
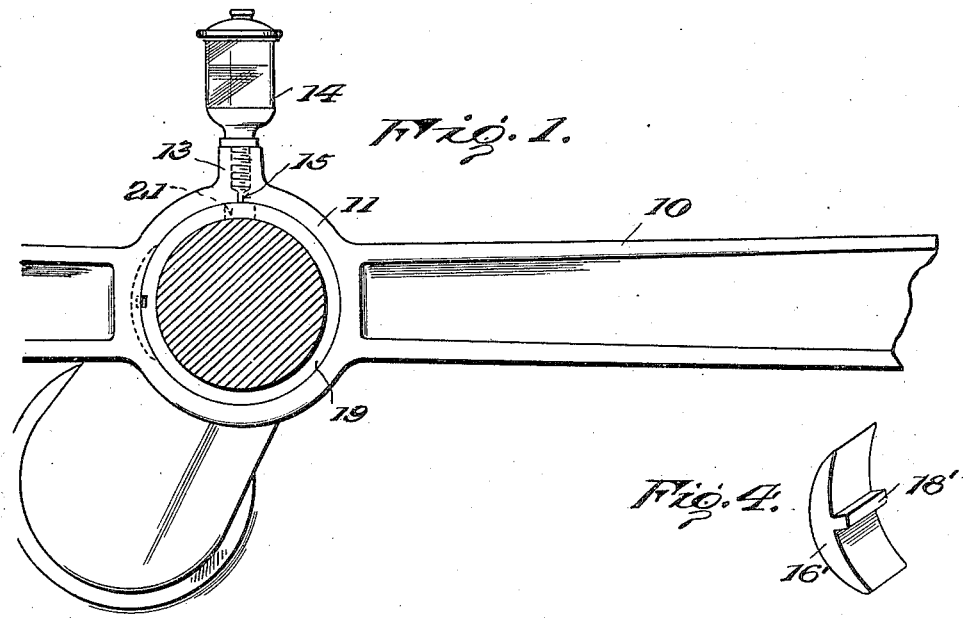
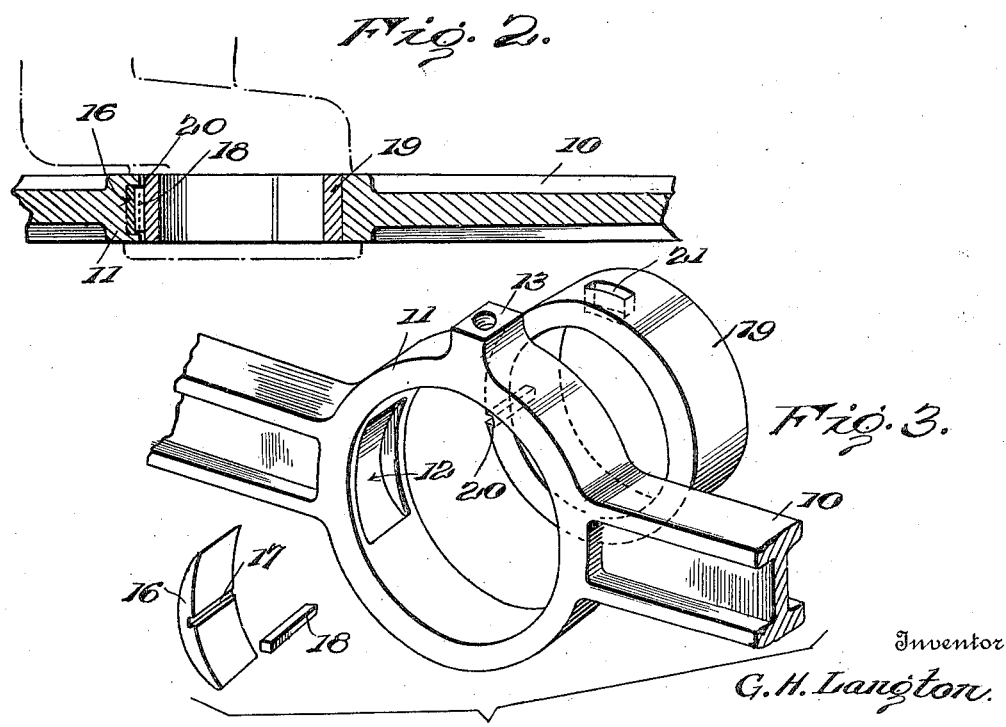
Inventor
G. H. Langton.
By Lacey & Lacey, Attorney

UNITED STATES PATENT OFFICE.

GEORGE H. LANGTON, OF PRINCETON, WEST VIRGINIA, ASSIGNOR OF ONE-HALF TO JOHN W. SMALL, OF ATLANTA, GEORGIA.

BUSHING-LOCK.

1,363,663.   Specification of Letters Patent.   Patented Dec. 28, 1920.

Application filed June 18, 1919. Serial No. 305,079.

*To all whom it may concern:*

Be it known that I, GEORGE H. LANGTON, citizen of the United States, residing at Princeton, in the county of Mercer and State of West Virginia, have invented certain new and useful Improvements in Bushing-Locks, of which the following is a specification.

This invention relates to an improved bushing lock and more particularly to a lock for the bushings of locomotive connecting rods, the invention having as one of its principal objects to provide a lock whereby the bushing will be positively prevented from rotating.

The invention has as a further object to provide a lock making it unnecessary to fit the bushing through the connecting rod under extreme pressure such as results in stretching of the bore of the rod to cause ultimate looseness of the bushing.

And the invention has as a still further object to provide a lock employing a locking member so constructed and arranged that shearing of the bushing by the locking member to permit looseness of the bushing will not occur.

Other and incidental objects will appear hereinafter. In the drawings:

Figure 1 is a fragmentary elevation showing my improved bushing lock in connection with a locomotive connecting rod, Fig. 2 is a horizontal sectional view particularly bringing out the manner in which the key of the lock is held against longitudinal displacement, Fig. 3 is a fragmentary perspective view showing the bushing, the bearing therefor, and the parts of the lock disassembled, and Fig. 4 is a detail perspective view showing a slight modification of the invention which relates more particularly to the locking member and key.

Referring now more particularly to the drawings, it will be seen that I have shown my improved bushing lock in conjunction with a locomotive connecting rod, the lock being particularly designed for connecting rod bushings. However, I do not wish to be limited in this regard since the lock is well adapted for use in other situations, the showing being merely typical of the use of the lock. Heretofore, it has been customary to press the bushings of a connecting rod into place under extreme hydraulic pressure. The pressure employed to seat each bushing is such that a stretching of the bushing bearing results so that consequent looseness ultimately ensues. Furthermore, since it is at present required that in practice, the bushings of locomotive connecting rods shall be locked against rotation, it has been common to employ a radial locking screw which is threaded through the bushing bearing and partly through the bushing. However, the extreme thrust upon the bushing such as arises under running conditions, soon results in a turning of the bushing with respect to the screw so that the screw shears the bushing with resultant looseness thereof. The present invention seeks to overcome these objectionable features.

In carrying the invention into effect, a connecting rod, conventionally illustrated at 10, is formed with an annular bushing bearing 11 and opening into the bore of this bearing at one side thereof is an arcuate recess or seat 12 preferably lying substantially in the plane of the connecting rod. The recess 12 extends circumferentially of the bearing and is tapered in depth toward its ends. At its upper side the bearing is formed with a boss 13 and removably threaded into this boss is an oil cup conventionally shown at 14, the cup communicating with a suitable lubricant channel 15 through the boss. Snugly fitting in the recess 12 is a substantially crescent shaped locking member or wedge 16, the convex wall of which seats flat against the concave bottom wall of the recess 12 while the concave wall of the locking member, at the inner side thereof, conforms to the contour of the bore of the bearing 11 and is of equal radius therewith. Formed in the locking member at its inner side is a transverse channel 17 arranged substantially midway between the ends of the member and opening through the side edges thereof. Snugly engaged in this channel is a key 18 preferably rectangular in cross section and of a length to abut at its ends, as particularly shown in Fig. 2, with the side walls of the recess 12. The key will thus be held by these side walls against longitudinal displacement from the channel 17 and it is now to be observed that the key is of a thickness to project beyond the locking member into the bore of the bushing bearing. Tightly and snugly fitted in said bore is the bushing 19. At one side this bushing is provided in its outer face with a transverse channel 20 opening through the side edges of the bushing and snugly receiving the portion of the key 18 projecting into the bushing bore. It will thus be clear that after the locking member 16 and key 18 are arranged in place, the channel 20 may be brought into register with the key when the bushing may be pressed into the bearing 11 when said key will then couple the bushing and locking member together. Formed through the bushing at its upper side is a slot or opening 21 which is elongated circumferentially of the bushing and is adapted to register with the lubricant channel 15.

As must now be clear, the locking member 16 will, since it is coupled to the bushing and snugly fits the curved wall of the recess 12, lock the bushing against any rotative movement whatever. However, even assuming that some looseness should develop between the locking member and its seat, slight rotation of the bushing in either one direction or the other will serve to wedge the locking member between the bushing and said seat when the locking member will then act to effectually overcome all looseness of the bushing and prevent further rotation thereof. The opening 21 is elongated to accommodate possible rotation of the bushing so that the lubricant channel 15 may always register with said opening for supplying lubricant within the bushing.

It will accordingly be seen that I provide a particularly effective construction for the purpose set forth while, at the same time, the construction is exceedingly simple in its details.

In Fig. 4 of the drawings, I have shown a slight modification of the invention. In this modification, the locking member is indicated at 16' and the key at 18', which instead of being separate from the locking member as in the preferred construction, is formed integral therewith, the key being arranged substantially midway between the ends of the locking member and projecting laterally from the inner side face thereof. In some instances it may be desired to thus form the locking member and key as an integral structure.

Having thus described the invention, what is claimed as new is:

1. A device of the character described including a bearing provided with an eccentric seat, a bushing fitted in the bearing, and a locking member housed within said seat to coact with and coupled with the bushing for locking the bushing against rotation.

2. A device of the character described including a bearing recessed to provide a seat, a locking member fitted in said seat, a bushing fitted in the bearing to confront said locking member, and a key lying between the locking member and bushing coupling said member to the bushing whereby to lock the bushing against rotation.

3. A device of the character described including a bearing recessed to provide a seat, a locking member fitting in said seat and provided with a channel, a bushing fitted in said bearing to confront the locking member and provided with a channel registering with said first mentioned channel, and a key engaging in said registering channels and held against displacement by the side walls of said seat, the key coupling the locking member to the bushing whereby to lock the bushing against rotation.

4. The combination with a bearing provided with an eccentric seat, and a bushing fitted in the bearing, of a locking member having a face eccentric to the bearing fitting said seat, and means coupling the locking member to the bushing whereby to lock the bushing against rotation.

5. A device of the character described including a bearing, a bushing fitted therein, locking means operable to bind between the outer face of the bushing and the bearing upon rotation of the bushing, and means coupling said locking means with the bushing.

6. A device of the character described including a bearing, a bushing fitted therein, and locking means for the bushing lying between the outer face of the bushing and the inner face of the bearing, said locking means being tapered circumferentially of the bushing.

In testimony whereof I affix my signature.

GEORGE H. LANGTON. [L. S.]